United States Patent [19]

Aonuma et al.

[11] Patent Number: 4,976,989

[45] Date of Patent: Dec. 11, 1990

[54] METHOD FOR PREPARING A MAGNETIC RECORDING MEDIUM

[75] Inventors: Masashi Aonuma; Tsutomu Okita; Hiroshi Hashimoto; Kingo Kobayashi, all of Kanagawa, Japan

[73] Assignee: Fuji Photo Film Co., Ltd., Kanagawa, Japan

[21] Appl. No.: 532,158

[22] Filed: Jun. 4, 1990

Related U.S. Application Data

[63] Continuation of Ser. No. 270,388, Nov. 10, 1988, abandoned, which is a continuation of Ser. No. 21,941, Mar. 5, 1987, abandoned.

[30] Foreign Application Priority Data

May 5, 1986 [JP] Japan .................................. 61-48017

[51] Int. Cl.$^5$ .............................................. H01F 10/02
[52] U.S. Cl. ...................................... 427/48; 427/36; 427/44; 427/128; 427/130; 427/177
[58] Field of Search ..................... 427/48, 36, 44, 128, 427/130, 177

[56] References Cited

U.S. PATENT DOCUMENTS 3,104,983 9/1963 Tarwater et al. ................ 117/93.31

Primary Examiner—Bernard Pianalto
Attorney, Agent, or Firm—Sughrue, Mion, Zinn, Macpeak & Seas

[57] ABSTRACT

A method for preparing a magnetic recording medium comprises the steps of coating, on a non-magnetic support, a magnetic layer mainly containing ferromagnetic particles and a binder polymerizable by radiation exposure, conducting a calendering treatment, and thereafter conducting a radiation exposure treatment without winding up the magnetic layer.

13 Claims, No Drawings

METHOD FOR PREPARING A MAGNETIC RECORDING MEDIUM

This is a continuation of application Ser. No. 07/270,388, filed Nov. 10, 1988, which is a continuation of application Ser. No. 07/021,914, filed on Mar. 5, 1987.

FIELD OF THE INVENTION

The present invention relates to a method for preparing a magnetic recording medium such as a video tape, an audio tape, a computer tape or a floppy disk and the like.

BACKGROUND OF THE INVENTION

As a binder generally and widely used for a magnetic recording medium, thermoplastic resins such as a vinyl chloride and vinyl acetate type resin, a vinyl chloride and vinylidene chloride type resin, a cellulose type resin, an acetal resin, an urethane resin, an acrylonitrile-butadiene resin and so on are used alone or in combination. However, use of the above binders is disadvantageous in that (1) the wear resistance of the magnetic layer is poor and (2) the running paths of the magnetic tape become stained.

Further, it is known that thermosetting resins such as a melamine resin, urea resin and the like are used as a binder and that a binder which is cross-linked by a chemical reaction such as a compound having an epoxy ring or an isocyanate compound is added to the above-described thermoplastic resins and is used as a binder. However, the use of a cross-linkable binder is disadvantageous in that (1) the storage stability of a solution wherein magnetic particles are dispersed is poor and accordingly, a homogeneous physical properties of the magnetic coating composition as well as a homogeneous quality of the magnetic recording medium cannot be obtained, and (2) a step of heat treatment for hardening a coated film after drying is indispensable and it takes a long time for the heat treatment.

In order to overcome the above-described disadvantages, a method for preparing a magnetic recording medium which comprises using an oligomer and an monomer of acrylic ester type as a binder and hardening the binder by radiation exposure after drying is known, as disclosed in Japanese Patent Publication No. 12423/1972, Japanese patent application (OPI) No. 13639/1972, 15104/1972, 77433/1975 and 25231/1981. However, in accordance with the above-described method, a magnetic recording medium having high electromagnetic properties and durability cannot be obtained.

Recently, high image quality of a magnetic recording medium has been required. For the above purpose, it is necessary that a video head and an audio head should be closely contacted with the surface of a magnetic layer and that not only the surface smoothness of the magnetic recording medium should be improved but also the dispersibility of the ferromagnetic fine particles should be greatly improved. However, as the surface of the magnetic layer becomes smoother, the friction of the running system of the video tape recorder becomes higher. Therefore, the running tension becomes high. As a result, excellent running durability of the magnetic recording medium under harsh conditions has been required more and more. For the above reasons, in accordance with the conventional method for preparing a magnetic recording medium, a magnetic recording medium having an adequate surface smoothness of the magnetic layer, good dispersibility of the ferromagnetic fine particles and running durability cannot be obtained.

SUMMARY OF THE INVENTION

An object of the present invention is to provide a method for preparing a magnetic recording medium having (1) good electromagnetic properties, (2) good dispersibility of ferromagnetic fine particles, (3) good storage stability and homogeneous quality of the magnetic coating composition and (4) good running durability.

The above-described objects of the present invention have been met by a method for preparing a magnetic recording medium comprising the steps of:

(A) coating, on a non-magnetic support, a magnetic layer mainly containing ferromagnetic particles and a binder which is polymerizable by radiation exposure;

(B) conducting a calendering treatment; and then (C) conducting a radiation exposure treatment without winding up the magnetic layer.

DETAILED DESCRIPTION OF THE INVENTION

The present invention is illustrated in more detail as follows.

Materials for the non-magnetic support of the present invention include polyesters such as polyethylene terephthalate, or polyethylene-2, 6-naphthalate; polyolefins such as polyethylene or polypropylene; cellulose derivatives such as cellulose triacetate, cellulose diacetate, cellulose acetate butyrate or cellulose acetate propionate; vinyl type resins such as polyvinyl chloride or polyvinylidene chloride; plastics such as polycarbonate, polyimide or polyamide imide; aluminum, copper, tin, zinc and non-magnetic alloy containing the same and non-magnetic metals such as stainless steel which are used depending upon usage; paper, baryta paper or papers coated or laminated with α-polyolefines having from 2 to 10 carbon atoms such as polyethylene, polypropylene or a copolymer of ethylene and butene. These non-magnetic supports can be transparent or non-transparent depending upon their usage.

The shape of non-magnetic supports is a film, a tape or a sheet and materials for the support can be optionally selected depending upon its shape. It is necessary that surface roughness in terms of Ra value is from 0.05 to $0.2\mu$, preferably 0.06 to $0.1\mu$, more preferably 0.07 to 0.05082 .

The thickness of the non-magnetic supports is from about 2 to 100 $\mu$m, preferably from 3 to 75 $\mu$m.

When the shape of the non-magnetic supports is a film, a tape, a sheet or a thin flexible disk, a backing layer can be provided on the support, on the opposite surface (back surface) to the surface provided with a magnetic layer, for the purposes of preventing from charging, print through, and wow flutter, and improving the strength of the magnetic recording medium and the runnability of the back surface.

The backing layer is prepared by mixing and kneading at least one additive such as a lubricating agent, an abrasive agent, an antistatic agent and the like and a dispersing agent for homogeneously dispersing the same, if necessary, with a binder and a solvent, dispersing the mixture, coating the dispersion on the back surface of the above support and drying it. The order of providing a magnetic layer and a backing layer on the support can be optional.

Generally and preferably used additives are carbon black, graphite, talc, $Cr_2O_3$, $\alpha$-$Fe_2O_3$ (red iron oxide) and silicon oil and preferred binders are thermosetting resins, reactive type resins or compounds which are cross-linkable or polymerizable with radiation exposure.

When the additives are inorganic compounds, they are used in an amount of from about 30 to 85 wt %, preferably from 40 to 80 wt % per the total solid content of the backing layer. When the additives are organic compounds, they are used in an amount of from about 0.1 to 30 wt %, preferably from 0.2 to 20 wt %. The dry thickness of the backing layer is from about 0.5 to 50 μm and is determined optionally depending upon the total thickness, usage, shape and purpose of the magnetic recording medium.

The binders used for a magnetic layer of the present invention are those compounds cross-linkable or polymerizable with radiation exposure and contain at least one of the following compounds (i) and (ii) respectively.

The polyvinyl chloride type compounds (i) having at least one polar group and one carbon-carbon unsaturated bond in the molecule are copolymers of (meth)acrylates such as a vinyl chloride type copolymer, a vinyl chloride and vinyl acetate type copolymer, a vinyl chloride and vinyl propionate type copolymer or a vinylidene chloride and vinyl acetate type copolymer containing a $CO_2H$, OH, $SO_3H$, $SO_3Na$, $OPO_3H$ or $OPO_3Na$ group as a polar group. The polar groups are preferably $CO_2H$ and OH groups, more preferably a $CO_2H$ group. When the polar group is a $CO_2H$ group, the $CO_2H$ content in the polymer having an acid value of from 1 to 30 is preferred, a $CO_2H$ content having an acid value of from 3 to 20 is more preferred and a $CO_2H$ content having an acid value of from 5 to 15 is the most preferred. When the acid value is outside the above ranges, the dispersibility of the ferromagnetic fine particles becomes poor and the electromagnetic properties largely deteriorate. The average content of the carbon-carbon unsaturated bond is from 1.5 to 20, preferably 2 to 15 per one molecule. When the content of the carbon-carbon unsaturated bond is outside the above ranges, the hardening property becomes deteriorated or the durability becomes poor.

The polyvinyl chloride type compounds as basic compounds are, for example, vinyl chloride and vinyl acetate copolymer, vinyl chloride, vinyl acetate and maleic acid copolymer, vinyl chloride, vinyl acetate and vinyl alcohol copolymer, vinyl chloride, vinyl acetate, maleic acid and vinyl alcohol copolymer, vinyl chloride, vinyl propionate and vinyl maleate copolymer, vinyl chloride, vinyl propionate and vinyl alcohol copolymer, vinylidene chloride, vinyl acetate and maleic acid copolymer, vinylidene chloride, vinyl propionate and vinyl alcohol copolymer-r, vinyl chloride, vinyl acetate and acrylic acid copolymer, vinyl chloride, vinyl acetate, acrylic acid and vinyl alcohol copolymer and saponified copolymers thereof can be also used. The carbon-carbon unsaturated bond can be obtained by modifying a part of a hydroxyl group or a carboxyl group of these copolymers or modifying a part of a hydroxyl group obtained by saponifying these copolymers. For example, the carbon-carbon unsaturated bond can be obtained by reacting a compound having an epoxy ring and a carbon-carbon unsaturated bond such as glycidylacrylate with some of the hydroxyl groups of the basic copolymer. Further, it can be obtained by reacting some of the carboxyl groups or the hydroxyl groups of the copolymer with one NCO group of polyfunctional isocyanate (e.g., 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate and tolylene diisocyanate 3 adduct product of trimethylol propane) and reacting the remaining NCO groups with active hydrogen compounds having a (meth)acryloyl group [hereinafter an acryloyl group and a methacryloyl group are called as (meth)acryloyl group] such as hydroxyalkyl (meth)acrylates [e.g., (meth)acrylic acid, 2-hydroxyethyl(meth)acrylate, 2-hydroxypropyl(meth)acrylate and 2-hydroxybutyl(meth)acrylate], (meth)acrylamide, and N-methylol(meth)acrylamide.

The polar group can be obtained, for example, by reacting some of the hydroxyl groups or carboxyl groups of the basic copolymer or some of the hydroxyl groups obtained by saponifying the copolymer with one NCO group of a polyfunctional isocyanate and reacting the remaining NCO groups with a hydroxyl compound containing a $CO_2H$ group, a $SO_3Na$ group, a $OPO_3Na$ group and the like. The polar group can be obtained at the same time with the reaction of (meth)acryloyl groups. A compound having both of a polar group and a (meth)acryloyl group can be used. The method for obtaining these groups is not limited to the aforementioned methods.

The polyurethane type compounds (ii) containing at least one group selected from a $CO_2H$ group, a $SO_3H$ group and a $SO_3Na$ group and at least one carbon-carbon unsaturated bond in a molecule can have any one of the mother skeleton of a polyester, polyether and a polyester ether. The specific examples of dibasic acid used therein are oxalic acid, malonic acid, succinic acid, glutaric acid, adipic acid, sebasic acid, dodecanedioic acid, maleic acid, fumaric acid, itaconic acid, trimethyl adipic acid, hexahydrophthalic acid, tetrahydrophthalic acid, phthalic acid, isophthalic acid, terephthalic acid and naphthalin dicarboxylic acid. The divalent alcohols used therein are ethylene glycol, trimethylene glycol, tetramethylene glycol, pentamethylene glycol, hexamethylene glycol, octamethylene glycol, diethylene glycol, triethylene glycol, tetraethylene glycol, 2,2-dimethylpropane-1,3-diol, 2,2-diethylpropane-1,3-diol, cyclohexane-1,3-diol, cyclohexane-1,4-diol, cyclohexane-hydroxyethoxy-cyclohexyl)propane, 2,2-bis(4-hydroxyethoxyphenyl)propane, 2,2-bis(4-hydroxyethoxyethoxy-phenyl)-propane and the like. The lactone type polyester skeleton such as γ-butylolactone, δ-valerolactone or ε-caprolactone can be also used. The isocyanates which form a urethane bond are polyisocyanates such as 2,4-tolylene diiocyahate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate, or tolylene diisocyanate 3 adduct product of trimethylol propane. A part of the above dibasic acid and divalent alcohol can be replaced with an acid and an alcohol which have more than three valencies. Among the $CO_2H$ group, the $SO_3H$ group and the $SO_3Na$ group, a $CO_2H$ group is preferred. A $CO_2H$ group and an acryloyl group can be positioned at the end of or at the side chain of the polyurethane. These groups can be obtained by (1) bonding at least one of an acid, an alcohol which has more than three valencies and an isocyanate to the urethane skeleton and reacting a urethane having a $CO_2H$ group, an OH group or a NCO group remaining at the side chain thereof with carboxylic acid compounds and (meth)acryloyl compounds which are capable of reacting with the above groups, and (2) reacting a urethane having an isocyanate group at the terminal thereof with active hydrogen compounds having at least one $CO_2H$ group, one (meth)acryloyl group and one OH group respectively.

The urethane type compounds used in the present invention have an acid value of preferably from 1 to 30, more preferably from 3 to 20 and most preferably from 5 to 15. The molecular weight thereof is from 1,000 to 100,000, preferably from 2,000 to 50,000 and most preferably from 3,000 to 30,000. When the acid value is outside the above ranges, the dispersibility of the ferromagnetic fine particles becomes poor with the result that the electromagnetic properties decrease or the durability deteriorates. The average content of (meth)acryloyl group is 1.5 to 10, preferably from 2 to 8 per a molecule.

When the molecular weight thereof is not more than 1000, such problems easily occur that the magnetic layer of thus obtained magnetic recording medium is too strong and is easily cracked when it is bent and that the magnetic recording medium easily curls with shrinkage upon hardening after radiation exposure. On the other hand, when the molecular weight thereof exceeds 100,000, the solubility of urethane(meth)acrylate in a solvent becomes poor and as a result, not only is handling inconvenient but also the dispersibility of the magnetic particles deteriorates and an enormous amount of energy is needed for hardening.

In the present invention, vinyl type monomers can be added. The vinyl type monomers are compounds which are polymerizable with radiation exposure and have at least one carbon-carbon unsaturated bond in the molecule, such as (meth)acrylic ester compounds, (meth)acrylamides, allyl compounds, vinyl ethers, vinyl esters, vinyl heterocyclic compounds, N-vinyl compounds, styrenes, acrylic acid, methacrylic acid, croton acids, itaconic acids, olefins and so on. Among those, the following compounds having at least two methacryloyl groups are preferred. The specific examples are (meth)acrylates of polyethylene glycol such as diethylene glycol di(meth)acrylate, triethylene glycol di(meth)acrylate or tetraethyleneglycol di(meth)acrylate, trimethylolpropane tri(meth)acrylate, pentaerythritol tetra(meth)acrylate, dipentaerythritol penta(meth) acrylate, dipentaerythritol hexa(meth)acrylate, tris($\beta$-(meth)acryloyloxyethyl)isocyanurate, bis($\beta$-(meth)acryloyloxyethyl)isocyanurate, a reaction compound of polyisocyanate (e.g., 2,4-tolylene diisocyanate, 2,6-tolylene diisocyanate, 1,3-xylylene diisocyanate, 1,4-xylylene diisocyanate, 1,5-naphthalene diisocyanate, 1,5-naphthalene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate hexamethylene diisocyanate, isophorone diisocyanate, dicyclohexylmethane diisocyanate and tolylene diisocyanate 3 adduct product of trimethylol propane) with hydroxy(meth)acrylate compounds (e.g., 2-hydroxyethyl(meth)acrylate, 2-hydroxypropyl(meth)acrylate and the like), and other poly(meth)acrylates having more than two functional groups. These monomers can be used alone or in combination.

The mixing ratio of the compounds (i) and the compounds (ii) is preferably from 20 to 90 parts by weight/from 80 to 10 parts by weight, particularly preferably from 30 to 80 parts by weight/from 70 to 20 parts by weight. When the compounds (i) or (ii) are used in a mixing ratio lower than the above ranges, durability cannot be obtained. The additive amount of the above-described vinyl monomer is preferably less than 50 parts by weight per total parts by weight of the compounds (i) and (ii). When the vinyl monomer is used in an amount more than the above range, the does amount of radiation necessary for polymerization becomes large, the magnetic recording medium curls or sufficient durability cannot be obtained.

The ferromagnetic fine particles used in the present invention are ferromagnetic iron oxide fine particles, Co doped ferromagnetic iron oxide fine particles, ferromagnetic chromium dioxide fine particles, ferromagnetic alloy particles and barium ferrite. The acicular ratio of ferromagnetic iron oxide and chromium dioxide is 2/1 to 20/1, preferably more than 5/1, and the effective average length thereof is about 0.2 to 2.0 $\mu$m. The ferromagntic alloy film particles having a metal content of 75 wt % or more, and more than 80 wt % of the metal content is ferromagnetic metal (i.e., Fe, Co, Ni, Fe-Ni, Co-Ni, and Fe-Co-Ni) and the longer diameter is about 1.0 $\mu$m or lower. In the present invention, the most effective ferromagnetic fine particles are ferromagnetic alloy particles having poor dispersibility, a BET surface are of 50 m$^2$/g or more or a crystal size of 200 Å or lower.

The lower solvents used for dispersing and coating the magnetic coating composition are ketones such as acetone, methyl ethyl ketone, methyl isobutyl ketone or cyclohexanone; esters such as methyl acetate, ethyl acetate, butyl acetate, ethyl lactate or monoethyl ether of glycol acetate; ethers such as ethyl ether, glycol dimethyl ether, glycol monomethyl ether, dioxane or tetrahydrofuran; aromatic hydrocarbons such as benzene, toluene or xylene; chlorinated hydrocarbons such as methylene chloride, ethylene chloride, carbon tetracloride, chloroform, ethylene chlorohydrin or dichlorobenzene.

To the magnetic coating composition of the present invention can be added additives such as a lubricating agent, an abrasive agent, a dispersing agent, an antistatic agent or a rust preventing agent.

The lubricating agents include saturated and unsaturated higher fatty acids, fatty acid esters, higher fatty acid amide and higher alcohols having 12 or more of carbon atoms, silicon oils, mineral oils, vegetable oils and fluorine type compounds and the like.

The above-described additives can be added when a coating composition is prepared, or can be coated or sprayed on the surface of a magnetic layer with or without dissolving in an organic solvent after drying or after radiation exposure.

The thickness of the magnetic layer before smoothing treatment is from 0.6 to 12$\mu$, preferably from 1.0 to 10 $\mu$m and it is preferred that the magnetic layer has Tg (peak temperature of the loss of the modulus of elasticity) of 30° C. or lower and has high surface smoothness. Surface smoothing treatment is done by calendering. Calendering is done by a super calendering method where a magnetic layer passes between a metal roll and a metal roll or between a metal roll and an elastic roll. The peak temperature of the loss of the modulus of elasticity referred to herein can be obtained by measuring the dynamic viscoelasticity and the distribution of temperature at a frequency of 110 Hz and an elevating temperature of 2° C./min.

In the present invention, both of metal roll and elastic roll having been mirror-finished (Ra value is about $0.03\mu$) are used.

Ra referred to herein means the center line average roughness in cut off of 0.25 mm as defined by JISBO 601.

It is preferred that metal rolls are super-mirror finished (Ra value is about $0.01\mu$).

The pressure between the rolls is from 100 to 500 kg/cm, preferably from 150 to 350 kg/cm and the temperature of the metal rolls is from 60° to 150° C., preferably from 75° C. to 105° C. Calendering is performed at a rate of from 10 to 500 m/min, which can be optionally selected.

The surface smoothness of a magnetic layer in terms of Ra value can be adjusted to $0.007\mu$ or lower by the above smoothing treatment. However, it has been found in the present invention that when a magnetic web is wound up by a take-up roll after calendering treatment and stored, unevenness on the surface opposite to a magnetic layer occurs. That is, the surface of a backing layer is printed through on the magnetic layer with the result that the surface smoothness of the magnetic layer is more deteriorated than that of the backing layer. Such tendency is more remarkable in a magnetic layer using a radiation hardenable binder than in a magnetic layer using thermosetting binders. In the magnetic layer using radiation hardenable binders, such tendency is greater as the Tg of the system becomes lower.

It has been found in the present invention that the deterioration of the surface smoothness of the magnetic layer due to print through is greater as the surface smoothness of the magnetic layer immediately after calendering treatment is increased. This is because the magnetic layer using radiation cross-linkable and hardenable binders is not yet hardened and the magnetic layer tends to easily deform. The surface smoothness of the backing layer is required to be $0.005\mu$ or higher in terms of Ra value in order to effectively perform the function of a magnetic recording medium.

Provided that the magnetic recording medium has a magnetic layer of which the surface smoothness is $0.007\mu$ or higher in terms of Ra value, the print through of unevenness of the backing layer on the magnetic layer is largely reduced.

It has been found in the present invention that when a radiation cross-linkable and hardenable magnetic layer having a Tg of 40° C. or lower is wound up by a take-up roll after calendering, it is extremely difficult to have a surface smoothness of $0.007\mu$ or lower in terms of Ra value. Therefore, in the method for preparing a magnetic recording medium in the present invention a magnetic layer is provided on a non-magnetic support, calendering treatment for smoothing is then conducted and subsequently radiation exposure is carried out without winding up the obtained web to harden the magnetic layer and then winding up the thus hardened web.

After the magnetic layer is hardened, it is slit to a desired size and can be wound up.

Otherwise, subsequent to the calendering treatment, the magnetic web is slit to a desired size, hardened with radiation exposure and then can be wound up.

The thus obtained magnetic recording medium has reduced print through of unevenness of the backing layer and has excellent surface smoothness. And as a result, a magnetic recording medium having excellent electromagnetic properties can be provided.

The radiations exposed to a magnetic layer of the present invention include electron beams, $\gamma$ rays, and $\delta$ rays, preferably electron beams. A scanning method, double scanning method, curtain beam method or broad beam curtain method can be used for accelerating the electron beams.

The electron beam radiation can be carried out using an accelerating voltage of from 100 to 1000KV, preferably from 150 to 300KV, and an absorption dose of 1 to 20 Mrad, preferably from 3 to 15 Mrads. When the accelerating voltage is 100KV or less, the transmitted amount of energy is insufficient and when the accelerating voltage is 1000KV or more, the energy efficiency used for polymerization is lowered and is uneconomical. When the absorption dose is 1 Mrad or less, the hardening reaction is insufficient to obtain a strong magnetic layer. When the absorption dose is 20 Mrads or more, the energy efficiency used for hardening is lowered or a radiation, object generates heat whereby particularly a plastic support tends to deform.

In order to prevent the plastic support from its deformation, it is effective to contact the plastic support with a metal roll capable of being cooled with water upon radiation exposure. On this occasion, it is desirable that the surface smoothness of the metal roll is $0.1\mu$ or lower, preferably $0.05\mu$ or lower in terms of Ra value. The web tension at the radiation exposure is 5 kg/web width or less and the radiation exposure is carried out at a rate of from 30 to 300 m/min. The atmosphere in a reaction room upon radiation exposure has an oxygen concentration of 5,000 ppm or less, preferably 1000 ppm or less.

The present invention is further illustrated in more detail by the following non-limiting Examples and Comparative Examples. In the Examples and Comparative Examples, all parts are by weight.

EXAMPLE 1

A magnetic coating composition having the following formulation was mixed and kneaded in a ball mill for 50 hours.

| | |
|---|---|
| Fe alloy particles (1500 Oe, BET specific surface, 50 m$^2$/g) | 400 parts |
| Formulation of the binder | |
| Acrylate of vinyl chloride copolymer type (containing CO$_2$H groups, acid value 8, molecular weight 20,000, average content of acryloyl group 2.8/molecule) | 32 parts |
| Urethane acrylate (containing CO$_2$H groups, acid value 5, molecular weight 10,000, average content of acryloyl group 3/molecule) | 24 parts |
| Trimethylol propane triacrylate | 24 parts |
| Stearic acid | 4 parts |
| Butyl stearate | 4 parts |
| $\alpha$-Al$_2$O$_3$ (preliminary average | 4 parts |

-continued

| | |
|---|---|
| particle size from 0.2 to 0.25μ) | |
| Carbon black | 10 parts |
| Methyl ethyl ketone | 800 parts |

The above mixture was dispersed and was coated on a polyethylene terephthalate support having an Ra of 0.007μ and a thickness of 10 μm using a doctor blade so that the dry thickness was 3 μm. The magnetic layer was subjected to orientation using cobalt magnets and a solenoid and the solvents were dried at 100° C. for 1 min. Then, the web was subjected to super calendering treatment using metal rolls at 85° C. under a linear pressure of 250 Kg, subsequently radiated with electron beams at an accelerating voltage of 165KV with an absorption dose of 10 Mrads on metal rolls cooled to 20° C. and having an Ra value of 0.03μ and then wound up, and was slit to a ½ inch width to obtain a video magnetic tape Sample No.1.

Magnetic tape samples were prepared in the same manner as in Example 1 except that the formulation of the binder was changed to that as shown in Table 1. The results of evaluations are shown in Table 2.

TABLE 1

| | | |
|---|---|---|
| Example 2 (Sample No. 2) | Acrylate of vinyl chlorade copolymer (acid value 14, molecular weight 20,000, average content of acryloyl group 3.4/molecule | 32 parts |
| | Urethane acrylate (acid value 8, molecular weight 10,000, average content of acryloyl group 3/molecule) | 16 parts |
| | Trimethylol propane triacrylate | 32 parts |
| Comparative Example 1 (Sample No. 3) | Acrylate of vinyl chloride type copolymer (acid value 0, molecular weight 20,000, average content of acryloyl group 3/molecule) | 48 parts |
| | Urethane acrylate (molecular weight 10,000, average content of acryloyl group 5/molecule) | 24 parts |
| Comparative Example 2 (Sample No. 4) | Copolymer of vinyl chloride, vinyl acetate and maleic acid (acid value 10, no carbon-carbon unsaturated bond) | 32 parts |
| | Urethane acrylate oligomer (containing no $CO_2H$ group) ("Aronics M1100, a trade name, manufactured by Toa Gosei Co., Ltd.) | 16 parts |
| | Tris-2-acryloyxyethyliso-cyanurate | 32 parts |

COMPARATIVE EXAMPLE 3

The magnetic layer was subjected to calendering treatment in the same manner as in Example 1 and wound up and then electron beam radiation was carried out under the same condition as in Example 1 and the magnetic layer was slit to obtain a video magnetic tape Sample No.5.

The results of evaluations are shown in Table 2.

COMPARATIVE EXAMPLE 4

In Comparative Example 2, the magnetic layer was subjected to calendering treatment, wound up and was radiated with an electron beam under the same conditions as in Comparative Example 2 and was slit to obtain a video magnetic tape Sample No.6.

The results of evaluations are shown in Table 2. The evaluations in Table 2 were made as follows:

Measurement of acid value:

In tetrahydrofuran, 1 g of sample was dissolved and then phenolphthalene was added as a pH indicator. The thus prepared solution was titrated with potassium hydroxide dissolved in a mixture of ethyl alcohol and water (volume ratio 95:5). The acid value is shown by an amount (mg) of potassium hydroxide required for the titration.

Time of still durability:

A certain video signal was recorded on a video tape (each sample) using a VHS video tape recorder ("NV8200" manufactured by Matsushita Electric Industries Ltd.) and the time of still durability was measured as the time until reproduced still images lost their image clarity. This experiment was conducted at 5° C. and 80% RH.

Video S/N:

A grey signal (50% set up) was recorded using the above-described video tape recorder and noise was measured by a S/N meter, "925C Type" manufactured by Shibasoku Co., Ltd., and was indicated in terms of the relative value as compared with the noise of Sample No. 1 which is referred to as 0 dB.

Ra value:

The Ra value is shown by a surface roughness (center-line average roughness) of a magnetic layer measured by contacting the layer with a diamond needle having a diameter of 2 μm at 0.25 m/m.

Tg value:

The Tg value is shown by a peak temperature corresponding to the loss modulus of elasticity where the dynamic viscoelasticity is measured by stretched and forced vibration of the samples at a frequency of 110 Hz and an elevating temperature of 2° C./min.

TABLE 2

| | Example | | Comparative Example | | | |
|---|---|---|---|---|---|---|
| Sample No. | 1 | 2 | 3 | 4 | 5 | 6 |
| Tg of magnetic layer before calendering (°C.) | 0 | −10 | 39 | 43 | 0 | 43 |
| Tg of magnetic layer after electron beam radiation (°C.) | 69 | 76 | 64 | 60 | 70 | 60 |
| Ra of magnetic layer (μ) | 0.005 | 0.004 | 0.008 | 0.008 | 0.009 | 0.009 |
| Video S/N (dB) | 0.0 | +0.4 | −2.1 | −2.3 | −3.0 | −2.6 |
| Still durability (min.) | 120 or more | 120 or more | 20 | 50 | 120 or more | 60 |

As clear from the above results, a magnetic recording medium prepared in accordance with the method of the present invention has good video S/N and good still durability.

What is claimed is:

1. A method for preparing a magnetic recording medium comprising the steps of:
   (A) coating, on a non-magnetic, a magnetic layer mainly containing ferromagnetic particles and a binder polymerizable by radiation exposure;

(B) orienting and drying the resulting magnetic layer of step (A);

(C) conducting a calendaring treatment, at a pressure of 100 to 500 kg/cm, on the resulting oriented and dried magnetic layer of step (B); and (D) thereafter conducting a radiation exposure treatment on the resulting calendaring magnetic layer of step (C) before winding up the magnetic layer.

2. The method of preparing a magnetic recording medium as claimed in claim 1 wherein the binder is composed of at least one of each of a member selected from groups (i) and (ii):

(i) polyvinyl chloride type compounds having at least one polar group and one carbon-carbon unsaturated bond in the molecule, (ii) urethane acrylate containing at least one group selected from the group consisting of $-CO_2H$, $-SO_3H$ and $-SO_3Na$ and at least one carbon-carbon unsaturated bond in a molecule.

3. The method as claimed in claim 2, wherein said polyvinyl chloride type compound having at least one polar group and one carbon-carbon unsaturated bond in a molecule is selected from the group consisting of vinyl chloride and vinyl acetate copolymer, vinyl chloride and vinyl propionate copolymer and vinylidene chloride and vinyl acetate copolymer containing a $CO_2H$, OH, $SO_3H$, $SO_3Na$, $OPO_3H$ or $OPO_3Na$ group as a polar group.

4. The method as claimed in claim 3, wherein said polar group is $CO_2H$ and said polymer has an acid value of 1 to 30.

5. The method as claimed in claim 3, wherein the average content of the carbon-carbon unsaturated bond is from 1.5 to 20.

6. The method as claimed in claim 2, wherein said urethane type compound has an acid value of 1 to 30 and a molecular weight of 1,000 to 100,000.

7. The method as claimed in claim 2, wherein the mixing ratio of compound (i) to compound (ii) is 20 to 90 parts by weight/from 80 to 10 parts by weight.

8. The method as claimed in claim 7, wherein the mixing ratio of compound (i) to compound (ii) is 30 to 80 parts by weight/from 70 to 20 parts by weight.

9. The method as claimed in claim 2, wherein said binder additionally contains a vinyl monomer in an amount of less than 50 parts by weight per total parts by weight of compounds (i) and (ii).

10. The method as claimed in claim 1, wherein said non-magnetic support has a surface roughness from $0.005\mu$ to $0.2\mu$.

11. The method as claimed in claim 1, wherein said non-magnetic support has a thickness of 2 to 100 μm.

12. The method as claimed in claim 1, wherein said calendaring treatment is performed so that said magnetic layer has the surface smoothness equal to or below $0.007\mu$.

13. The method as claimed in claim 1, wherein said calendering treatment is performed at a temperature of the metal rolls of from 60° to 150° C. and at a rate of from 10 to 500 m/min.

* * * * *